Figure 1:
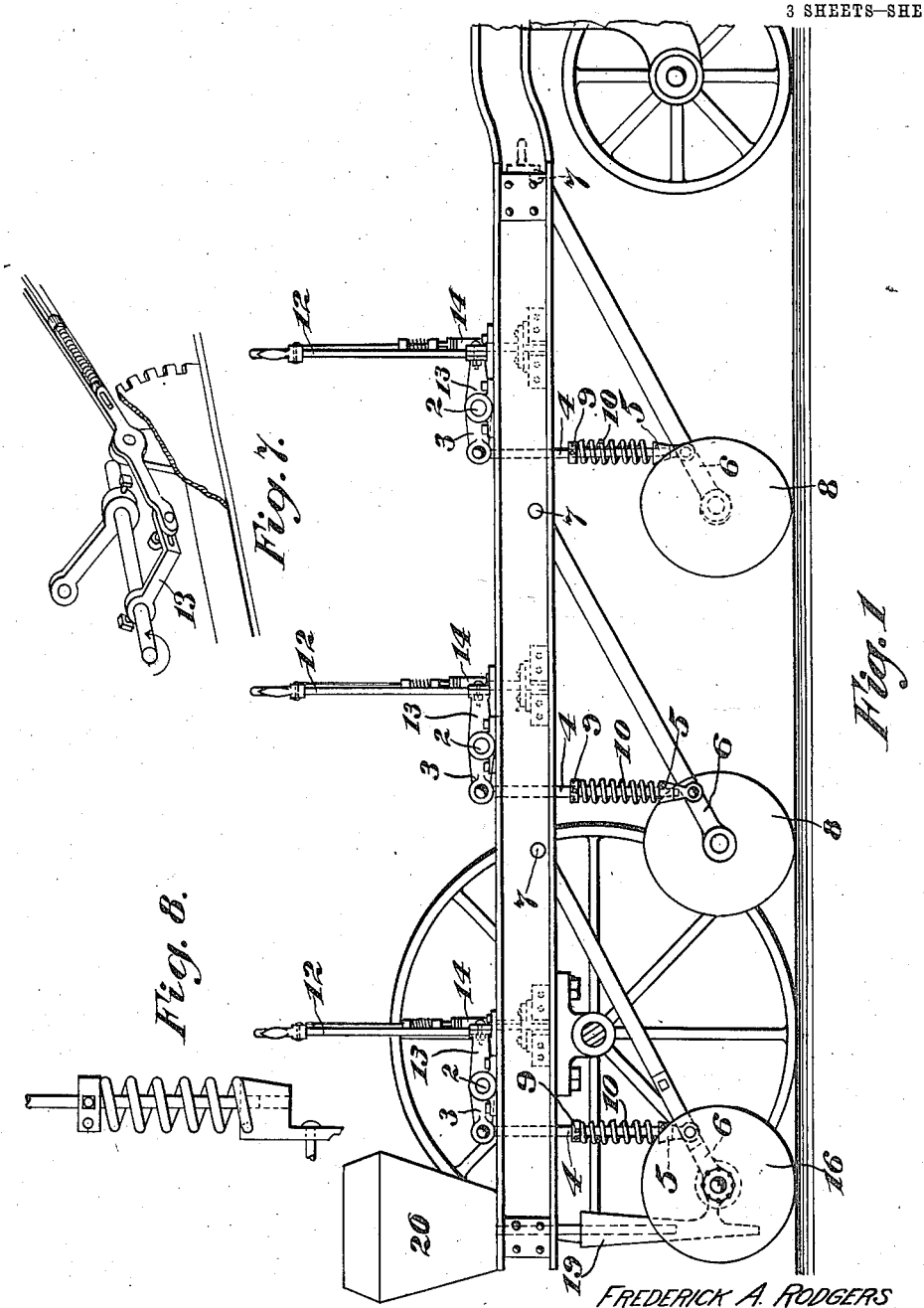

F. A. RODGERS.
COMBINED HARROW AND SEEDER.
APPLICATION FILED AUG. 11, 1909.
989,725.
Patented Apr. 18, 1911.
3 SHEETS—SHEET 3.
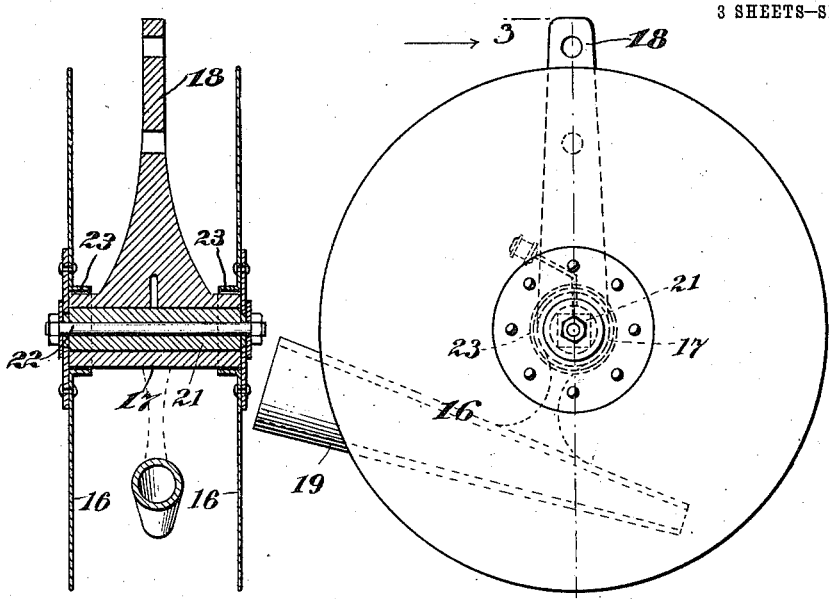
Fig. 3.   Fig. 4.
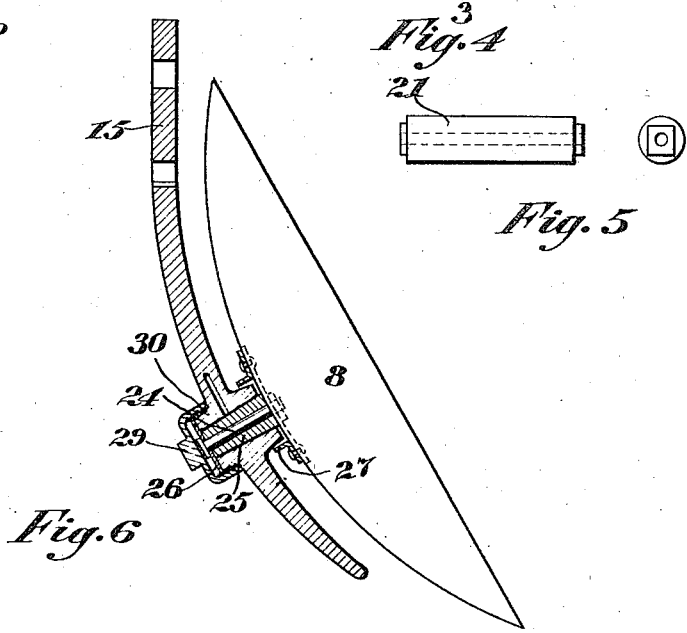
Fig. 5.
Fig. 6.
Witnesses:
FREDERICK A. RODGERS
Inventor,
By
Attorneys

UNITED STATES PATENT OFFICE.

FREDERICK A. RODGERS, OF GLEN EWEN, SASKATCHEWAN, CANADA.

COMBINED HARROW AND SEEDER.

989,725. Specification of Letters Patent. Patented Apr. 18, 1911.

Application filed August 11, 1909. Serial No. 512,440.

*To all whom it may concern:*

Be it known that I, FREDERICK A. RODGERS, a subject of the King of Great Britain, residing at Glen Ewen, in the Province of Saskatchewan, Canada, have invented certain new and useful Improvements in Combined Harrows and Seeders; and I do hereby declare that the following is a full, clear, and exact description of the invention, such as will enable others skilled in the art to which it appertains to make and use the same.

The invention to be hereinafter described relates to agricultural implements, and particularly to a combined disk harrow and seeder.

Broadly speaking, it comprises a framework, a plurality of harrow disks arranged in oppositely inclined sections, a set of removable disks, and a set of sod cutters and drills adapted to replace the removable disks.

In order to more clearly disclose the construction, arrangement and disposition of the several parts of the invention, reference should be had to the accompanying drawings forming part of this applicaiton.

Throughout the several figures of the drawings, like reference characters designate the same parts.

Figure 2:
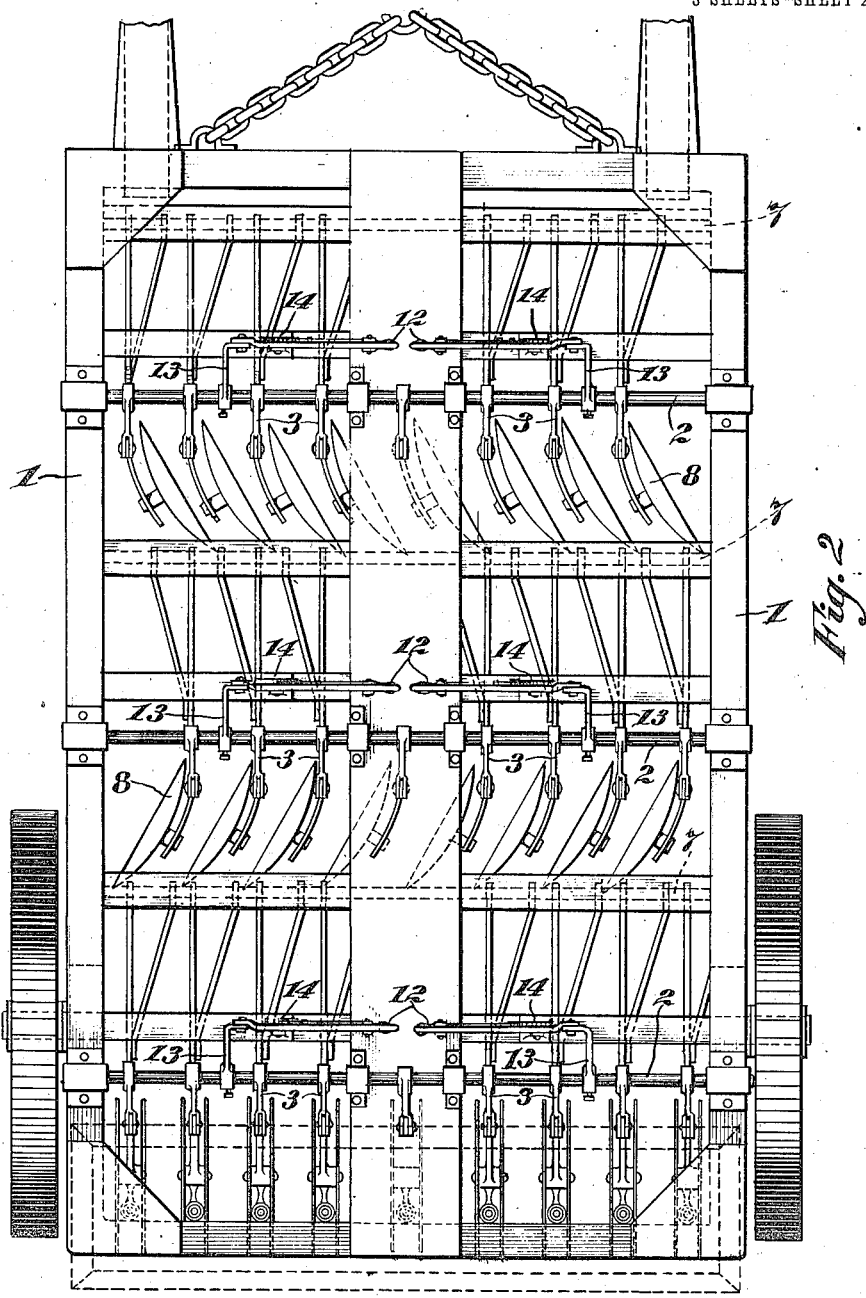

In the drawings: Figure 1 is a side elevation of the machine, with the drills attached; Fig. 2 is a plan view of Fig. 1, with the seed box in dotted lines; Fig. 3 is a central vertical cross section through one of the sod cutters, detached; Fig. 4 is a side elevation of Fig. 3; Fig. 5 is a front view of the spacing sleeve used with the disks of the sod cutter; Fig. 6 is a vertical section through the means for attaching the harrow disks, one disk being shown in side elevation; Fig. 7 is a fragmentary view, showing the connections for rocking shafts 2; and Fig. 8 is an enlarged detail view of the connections between the parts 4 and 5.

Referring to the drawings in detail, 1 indicates a wheeled frame of ordinary construction and adapted to support the several working parts of the machine. In this frame are suitably journaled a plurality of parallel transverse rock shafts 2, to which are secured rock arms 3. To the outer end of each of these arms is pivotally connected a rod 4. The lower end of this rod is slidably mounted in a sleeve 5, pivotally connected to a draft beam 6 at a point a short distance from the lower end of the draft beam. The upper end of each draft beam is journaled to move freely on a transverse rod 7, while its lower end supports an inclined concave harrow disk 8. In order to enable slight independent movement of each disk 8 relatively to its connecting rod 4, the connections between the rod and draft beam 6 are made yieldable and comprise a collar 9 on the rod and a coil spring 10 adapted to be interposed between the collar and the top of the sleeve 5, the opposite ends of the spring being connected to the collar 9 and sleeve 5, respectively.

If it is desired to raise all of the disks of any one section to inoperative position, it is simply necessary to depress the hand levers 12. These hand levers 12 are arranged in pairs on either side of the center of the machine, so that both levers of any one pair may be grasped and operated at the same time. Each lever is connected by a sliding joint to a rock arm 13 fixed to the shaft 2, and is pivoted to a rack plate or a notched arc plate 14 fixed to the frame and is provided with a spring catch adapted to selectively engage the notches of the rack plate to hold the disks 8 in adjusted position.

The rear set of disks, instead of being attached directly to the draft beams 6, are each secured to a plate 15 adapted to be removably connected to the draft beam 6. Therefore, it is possible to remove this rear set of disks and replace them with combination sod cutters and drills. This combination attachment comprises pairs of sod cutting disks 16, mounted on opposite ends of a sleeve 17, from which extends a connecting arm or plate 18 and a tubular drill head 19 adapted to receive seed from the usual seed box 20 mounted on the rear of the frame 1. The arms or plates 18 are connected to the rear set of draft beams 6 in the same manner that the disks 8 are connected to the other draft beams. In order to allow free and easy rotation of the disks 16, cylindrical spacing blocks 21 are provided, and are adapted to extend through the sleeves 17, as shown in Fig. 3. Bolts 22 are passed through the disks and blocks, and act to clamp the disks to the ends of the blocks. The disks are provided with flanges 23, adapted to surround the outer ends of the sleeves 17 and act to center the disks thereon and prevent bending or twisting of the body of the disk.

The harrow disks 8 are removably connected to their plates 15 by bolts 24 passed through blocks 25 seated in bearings formed in the plates 15. Washers 26 of greater diameter than the ends of the blocks 25 are placed between the heads of the bolts 24 and the ends of the bearings, and so hold the blocks 25 and bolts 24 in operative position. The disks 8 are provided with flanges 27, which act to center the disks and prevent bending or twisting of the same. In order to keep dust and grit out of the bearing of the disk 8, a dust cap 29 is provided. This dust cap is adapted to be screwed over the boss 30, through which the block 25 and bolt 24 are passed.

It is thought that the operation and use of the invention will be clear from the preceding detailed description.

Changes may be made in the construction, arrangement and disposition of the several parts of the invention, without in any way departing from the field and scope of the same, and it is meant to include all such within this application, wherein only preferred forms have been disclosed.

Having thus fully described my invention, what I claim as new and desire to secure by Letters Patent, is:—

A machine of the character described comprising a frame, rockshafts journaled therein, a plurality of draft beams pivotally mounted in said frame, sleeves mounted on said draft beams, rods projecting into and slidable in said sleeves, an adjusting collar secured on each of said rods, a spiral spring slipped on each of said rods and fastened at its ends to the respective collar and sleeve of said rod, rock arms, in the ends of which the upper ends of said rods are pivotally secured, connecting said rods to said rock shafts, hand levers arranged in pairs pivoting toward or from each other, notched arc plates to which said levers are respectively pivoted, a spring pressed pin for each lever entering selectively said notches and rock arms fixedly connected to said rock shafts and slidably pivotally connected to said levers substantially as set forth.

In witness whereof I have hereunto set my hand in the presence of two witnesses.

FREDERICK A. RODGERS.

Witnesses:
S. R. WALLACE,
JAMES D. MURPHY.